(12) United States Patent
Chancerelle et al.

(10) Patent No.: US 12,397,923 B2
(45) Date of Patent: Aug. 26, 2025

(54) AIRCRAFT AIR INTAKE COMPRISING AN OUTER WALL AND FRONT AND REAR FRAMES LINKED BY AT LEAST ONE JOINING ELEMENT DISTINCT FROM THE OUTER WALL

(71) Applicant: Airbus Operations SAS, Toulouse (FR)

(72) Inventors: Emeric Chancerelle, Toulouse (FR); Franck Dobigeon, Toulouse (FR); Brice Saudel, Toulouse (FR); Grégoire Smith, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/787,458

(22) Filed: Jul. 29, 2024

(65) Prior Publication Data
US 2025/0042565 A1 Feb. 6, 2025

(30) Foreign Application Priority Data

Jul. 31, 2023 (FR) ...................................... 2308265

(51) Int. Cl.
*F02C 7/04* (2006.01)
*B64D 33/02* (2006.01)

(52) U.S. Cl.
CPC ................ *B64D 33/02* (2013.01); *F02C 7/04* (2013.01)

(58) Field of Classification Search
CPC ................ F02C 7/04; F02C 7/045; F02C 7/28
See application file for complete search history.

(56) References Cited

U.S. PATENT DOCUMENTS

| 10,160,552 | B2 * | 12/2018 | Crawford | F02C 7/04 |
|---|---|---|---|---|
| 2005/0218261 | A1 | 10/2005 | Porte et al. | |
| 2011/0168852 | A1 * | 7/2011 | Porte | B64C 21/10 |
| | | | | 427/299 |
| 2011/0284095 | A1 | 11/2011 | Vauchel et al. | |
| 2015/0129045 | A1 * | 5/2015 | Kane | B64D 33/02 |
| | | | | 137/15.1 |
| 2016/0375988 | A1 * | 12/2016 | Brown | B64D 29/00 |
| | | | | 244/53 B |
| 2020/0130856 | A1 | 4/2020 | West | |
| 2020/0290747 | A1 * | 9/2020 | Delsol | B64C 3/28 |

FOREIGN PATENT DOCUMENTS

CA 2500963 A1 9/2005

OTHER PUBLICATIONS

French Search Report for corresponding French Patent Application No. 2308265 dated Jan. 4, 2024.

* cited by examiner

*Primary Examiner* — Thuyhang N Nguyen
(74) *Attorney, Agent, or Firm* — Greer, Burns & Crain, Ltd.

(57) ABSTRACT

An aircraft air intake comprising a lip, an internal panel which comprises a front edge linked to the lip, a front frame which comprises an outer edge and an inner edge linked to the lip and/or to the internal panel, a rear frame which comprises an outer edge, directly or indirectly linked to the lip and an inner edge linked to the rear edge of the internal panel, and at least one joining element linking the outer edges of the front frame and of the rear frame.

9 Claims, 3 Drawing Sheets

AIRCRAFT AIR INTAKE COMPRISING AN OUTER WALL AND FRONT AND REAR FRAMES LINKED BY AT LEAST ONE JOINING ELEMENT DISTINCT FROM THE OUTER WALL

CROSS-REFERENCES TO RELATED APPLICATIONS

This application claims the benefit of French Patent Application Number 2308265 filed on Jul. 31, 2023, the entire disclosure of which is incorporated herein by way of reference.

FIELD OF THE INVENTION

The present application relates to an aircraft air intake comprising an outer wall and front and rear frames linked by at least one joining element distinct from the outer wall and to an aircraft comprising at least one propulsion assembly which comprises such an air intake.

BACKGROUND OF THE INVENTION

According to an embodiment visible in FIG. 1, an aircraft 10 comprises several propulsion assemblies 12 each comprising an engine system 14 and a nacelle 16 surrounding the engine system 14 and notably making it possible to channel an air flow towards the engine system 14.

The engine system 14 has an axis of rotation A14. Hereinafter in the description, a longitudinal direction is a direction parallel to the axis of rotation 14. A longitudinal plane is a plane containing the axis of rotation A14. Finally, a transverse plane is a plane at right angles to the axis of rotation A14. The front and rear concepts refer to the direction of flow of the air flow in the engine system in operation, which flows from the front to the rear.

As illustrated in FIG. 2, each nacelle 16 comprises, at the front, an air intake 18 configured to separate a laminar air flow 20 into a laminar internal air flow 20.1 which enters into the nacelle 16 towards the engine system 14 and a laminar external air flow 20.2 flowing out of the nacelle 16.

According to an embodiment visible in FIGS. 2 and 3, an air intake 18 comprises a lip 22 which has a C form in cross-section in a longitudinal plane. The lip 22 comprises a leading edge 24.1 which splits the air flow 20 into an internal air flow 20.1 and an external air flow 20.2, an outer portion 24.2 which extends from the leading edge 24.1 to an outer rear edge 22.1 of the lip 22 over which the external air flow 20.2 flows, and an inner portion 24.3 which extends from the leading edge 24.1 to an inner rear edge 22.2 of the lip 22 and over which the internal air flow 20.1 flows.

The air intake 18 also comprises:
- an internal panel 26 positioned in the extension of the inner portion 24.3 of the lip 22 which has a front edge 26.1 linked to the inner rear edge 22.2 of the lip 22 and a rear edge 26.2,
- a front frame 28, in ring form, which has a peripheral outer edge 28.1 linked to the outer portion 24.2 of the lip 22 and a peripheral inner edge 28.2 linked to the inner portion 24.3 of the lip 22 and/or to the internal panel 26,
- a rear frame 30, in ring form, which has a peripheral outer edge 30.1 linked to the outer rear edge 22.1 of the lip 22 and a peripheral inner edge 30.2 linked to the rear edge 26.2 of the internal panel 26.

The front frame 28 and the lip 22 delimit an annular duct 32 in D form, called D-duct.

According to an embodiment, the front and rear frames 28, 30 are positioned approximately in two transverse planes. In a variant, the front frame can be slightly tapered and form, with a transverse plane, an angle of the order of 10°.

According to one configuration, the internal panel 26 is equipped with an acoustic attenuation structure.

As illustrated in FIGS. 2 and 3, according to one arrangement, the peripheral outer edge 28.1 of the front frame 28 has a rim 34 pressed against the outer portion 24.2 of the lip 22 and linked thereto by a series of link elements 36 distributed over the entire circumference of the nacelle.

According to another embodiment, the outer rear edge of the lip 22 is linked to the front frame 28 by a first series of link elements. In addition, the air intake comprises an external panel positioned in the extension of the outer portion 24.2 of the lip 22 which has a front edge linked to the front frame and a rear edge linked to the rear frame.

The fact that the lip and the external panel are produced in a single piece as illustrated in FIGS. 2 and 3 makes it possible to not have discontinuity at the surface in contact with the external air flow and therefore to limit the aerodynamic disturbances. However, when the lip extends to the rear frame 30, its replacement entails dismantling a large number of link elements, namely link elements linking the lip 22, the internal panel 26 and the peripheral inner edge 28.2 of the front frame 28, link elements linking the lip 22 and the peripheral outer edge 28.1 of the front frame 28 and finally link elements linking the lip 22 and the rear frame 30.

According to another drawback, whatever the embodiment, the air intake 18 comprises at least one series of link elements, positioned in line with the front frame 28, which are flush with a wall of the air intake (the lip 22 and/or an external panel) in contact with the external air flow 20.2.

In operation, the external air flow 20.2 is laminar from the leading edge 24.1 (also called aerodynamic stagnation point) over a certain length which must be as long as possible to reduce the drag generated by the air intake 18 of the nacelle 16. Without link elements (like screws, rivets or similar), the theoretical length, characterizing the laminar air zone, could reach a distance of the order of 400 to 950 mm depending on the size of the nacelle. According to the embodiment visible in FIGS. 2 and 3, the air intake 18 comprises link elements 36 spaced apart from the leading edge 24.1 by a distance less than 500 mm, of the order of 300 mm, which generate disturbances, which is reflected by an increase in the drag of the air intake 18 of the nacelle 16 and, ultimately, in the energy consumption of the aircraft 10.

SUMMARY OF THE INVENTION

The present invention aims to remedy all or some of the drawbacks of the prior art.

To this end, the subject of the invention is an aircraft air intake comprising:
- a lip which comprises a leading edge, an outer rear edge and an inner rear edge,
- an internal panel which comprises a front edge linked to the inner rear edge of the lip and a rear edge,
- a front frame which comprises a front peripheral outer edge and a front peripheral inner edge linked to the lip and/or to the internal panel, a rear frame which comprises a rear peripheral outer edge, directly or indirectly linked to the outer rear edge of the lip and a rear peripheral inner edge linked to the rear edge of the internal panel.

According to the invention, the air intake comprises at least one joining element linking the front and rear peripheral outer edges of the front frame and of the rear frame.

Since the front frame is not linked to the lip, the air intake does not have any link element, in line with the front frame, flush with the outer face of the lip. Thus, the air flow which flows in contact with the air intake retains its laminar nature over a greatest possible length.

According to an embodiment, the air intake comprises a single tubular joining element, substantially coaxial to the internal panel.

According to another embodiment, the air intake comprises several joining elements spaced apart from one another, distributed around the internal panel.

According to another feature, each joining element has a front end, the air intake comprising a front link system which links the front end of each joining element and the front peripheral outer edge of the front frame.

According to another feature, the front peripheral outer edge of the front frame is bent back so as to have a substantially cylindrical form. In addition, the front link system comprises at least one series of link elements, distributed over at least one circle, passing through the front peripheral outer edge of the front frame and the front end of each joining element.

According to another feature, each joining element has a rear end, the air intake comprising a rear link system which links the rear end of each joining element and the rear peripheral outer edge of the rear frame.

According to another feature, the rear end of each joining element is bent back and pressed against the rear peripheral outer edge of the rear frame. In addition, the rear link system comprises at least one series of link elements, distributed over at least one circle, passing through the rear end of each joining element and the rear peripheral outer edge of the rear frame.

According to another feature, the lip and each joining element are linked by a link system situated in proximity to the outer rear edge of the lip.

According to another feature, each joining element has a rib, in line with the link system, configured to space apart the lip and each joining element outside of the rib.

According to another feature, for each joining element, the rib has a substantially cylindrical central part, more spaced apart from the internal panel than the rest of the joining element, and two tapered parts linking the central part to the rest of the joining element.

Also a subject of the invention is an aircraft comprising at least one propulsion assembly which comprises an air intake according to one of the preceding features.

BRIEF DESCRIPTION OF THE DRAWINGS

Other features and advantages will emerge from the following description of the invention, a description given purely by way of example, in light of the attached drawings in which.

DETAILED DESCRIPTION OF THE PREFERRED EMBODIMENTS

Figure 1:
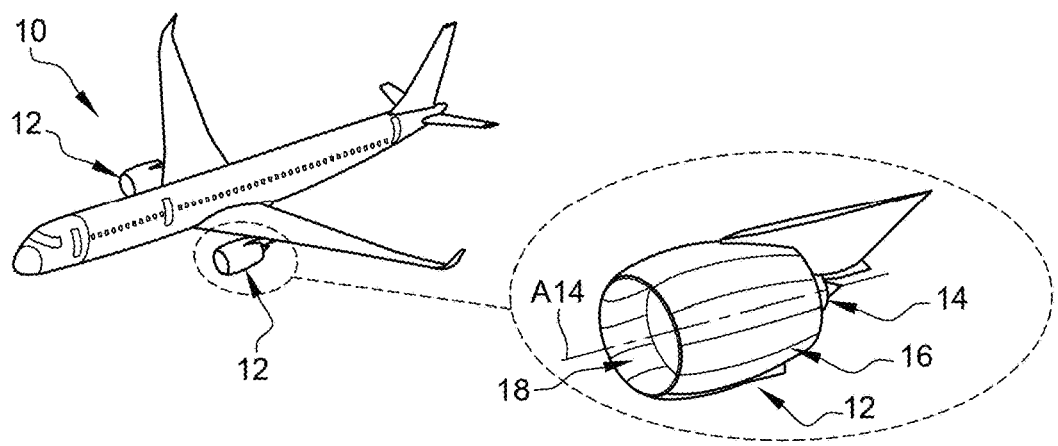
FIG. 1 is a perspective view of an aircraft and a propulsion assembly.
Figure 2:
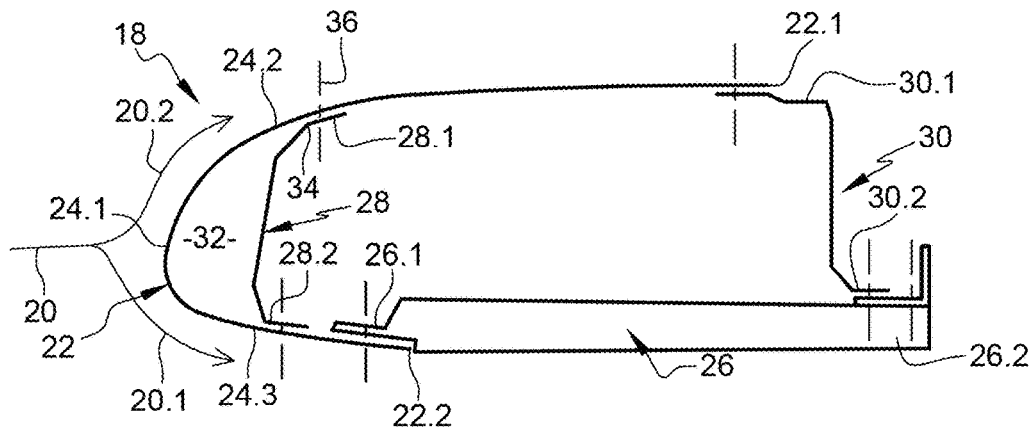
FIG. 2 is a longitudinal cross-section of an air intake of an aircraft nacelle illustrating an embodiment of the prior art.
Figure 3:
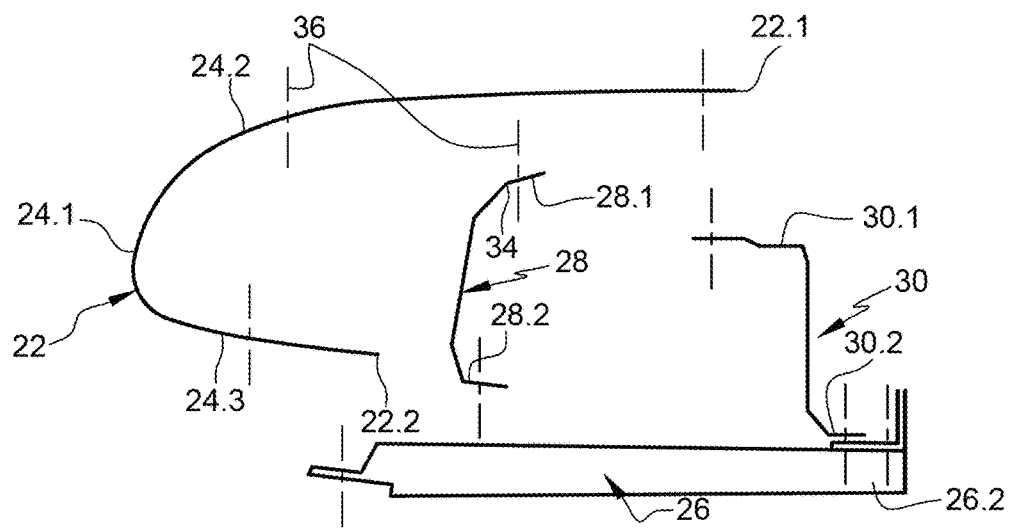
FIG. 3 is a longitudinal cross-section of the intake visible in FIG. 2, the lip being in the dismantled state.

According to an embodiment, an aircraft comprises at least one propulsion assembly which comprises an air intake 40 to channel an air flow 42 towards an engine system.

Apart from the air intake 40, the other elements of the propulsion assembly are not represented in FIGS. 4 to 8. They are known to the person skilled in the art and can be identical to those of the prior art. The air intake 40 has a longitudinal axis coinciding with the engine system axis when the air intake 40 is linked to the engine system.

The air intake 40 comprises a lip 44 which has a C form in cross-section in a longitudinal plane. The lip 44 comprises a leading edge 46.1 which splits the air flow 42 into an external air flow 42.1 and an external air flow 42.2, an outer portion 46.2 which extends from the leading edge 46.1 to an outer rear edge 44.1 of the lip 44 and over which the external air flow 42.2 flows, as well as an inner portion 46.3 which extends from the leading edge 46.1 to an inner rear edge 44.2 of the lip 44 and over which the internal air flow 42.1 flows.

The lip 44 has an outer face F44 in contact with the internal and external air flows 42.1, 42.2 and an inner face F44'.

The air intake 40 also comprises:
an internal panel 48 positioned in the extension of the inner portion 46.3 of the lip 44, substantially (+/−10%) coaxial to the longitudinal axis of the air intake, which has a front edge 48.1 linked to the inner rear edge 44.2 of the lip 44 and a rear edge 48.2,
a front frame 50, in ring form, which has a front peripheral outer edge 50.1 and a front peripheral inner edge 50.2 linked to the inner portion 46.3 of the lip 44 and/or to the internal panel 48,
a rear frame 52, in ring form, which has a rear peripheral outer edge 52.1 linked to the outer rear edge 44.1 of the lip 44 and a rear peripheral inner edge 52.2 linked to the rear edge 48.2 of the internal panel 48.

According to an embodiment, the front and rear frames 50, 52 are positioned approximately in two transverse planes. In a variant, the front or rear frame can be slightly tapered and form, with a transverse plane, an angle of the order of 10° (+\−10%).

According to one configuration, the internal panel 48 is equipped with an acoustic attenuation structure.

The air intake 40 comprises a first link system 54 linking the front edge 48.1 of the internal panel 48 and the inner rear edge 44.2 of the lip 44. According to one arrangement, the front edge 48.1 of the internal panel 48 is pressed against the inner face F44' of the lip 44 at the inner rear edge 44.2 of the lip 44. In addition, the first link system 54 comprises a series of link elements 54.1, distributed over at least one circle about the longitudinal axis of the air intake 40, passing through the parts of the lip 44 and of the internal panel 48 which overlap.

Figure 4:
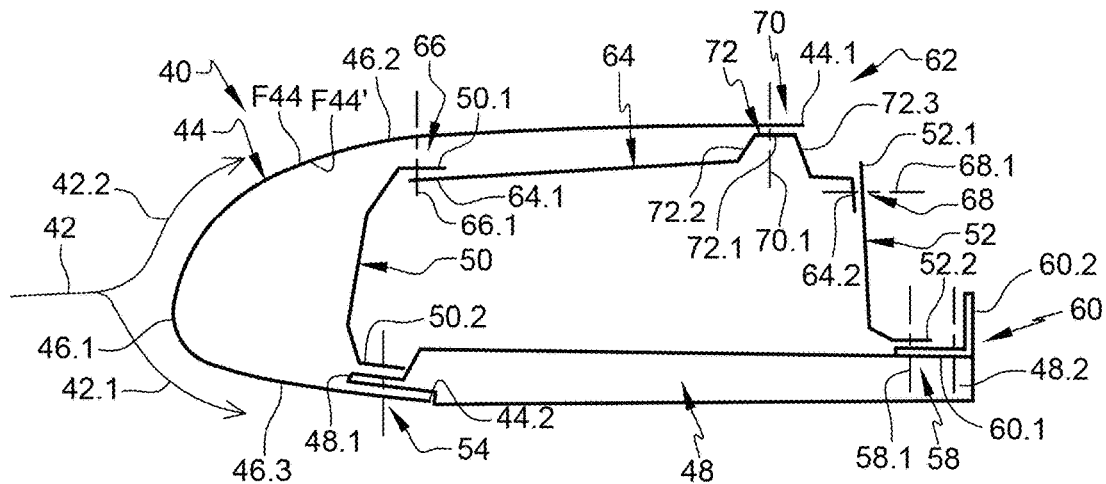
FIG. 4 is a longitudinal cross-section of an air intake of an aircraft nacelle illustrating an embodiment of the invention.
Figure 5:
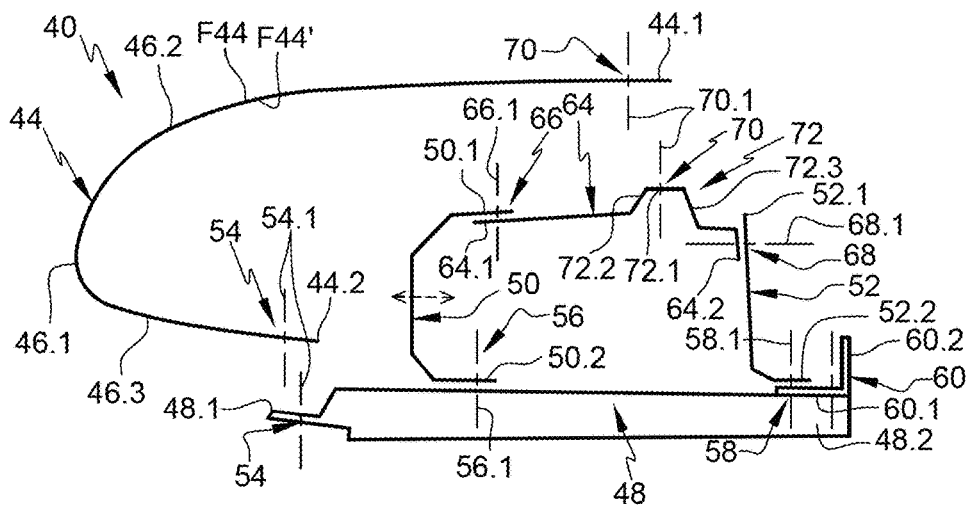
FIG. 5 is a longitudinal cross-section of an air intake of an aircraft nacelle illustrating another embodiment of the invention, the lip being in the dismantled state.

According to an embodiment visible in FIG. 4, the first link system 54 makes it possible to link the front edge 48.1 of the internal panel 48, the inner rear edge 44.2 of the lip 44 and the front peripheral inner edge 50.2 of the front frame 50. In this case, the front peripheral inner edge 50.2 of the front frame 50 is bent back and pressed against the front edge 48.1 of the internal panel 48. In addition, the first link system 54 comprises a series of link elements 54.1, distributed over at least one circle about the longitudinal axis of the air intake 40, passing through the parts of the lip 44, of the internal panel 48 and of the front frame 50 which overlap.

Figure 6:
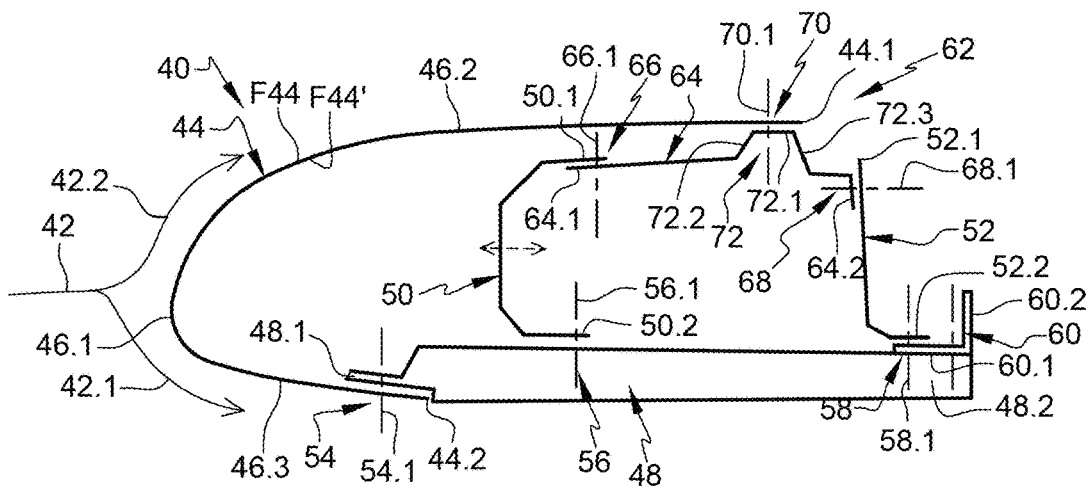
FIG. 6 is a longitudinal cross-section of the air intake visible in FIG. 5, the lip being in the fitted state.
Figure 7:
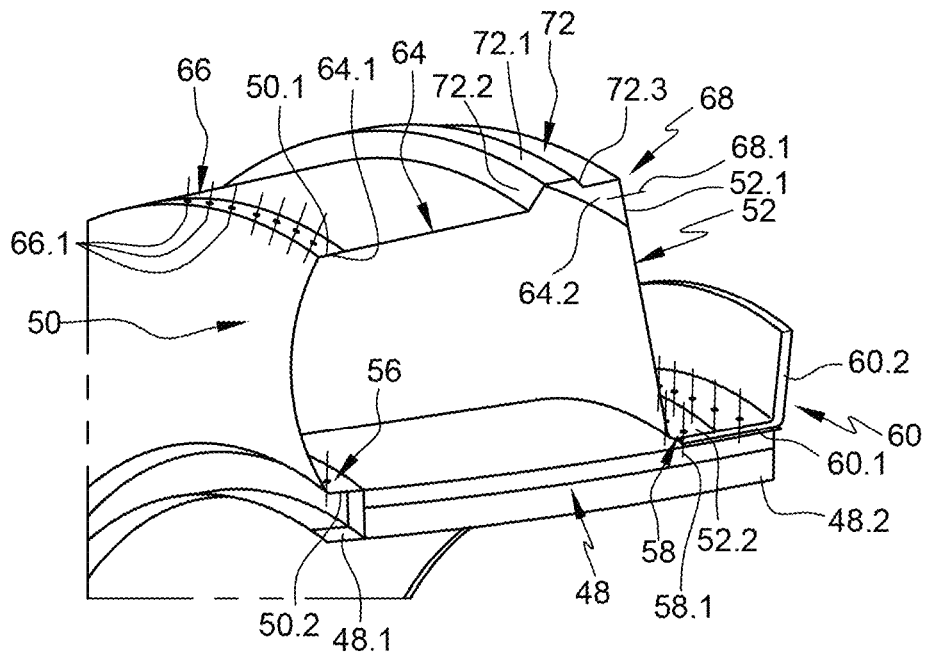
FIG. 7 is a perspective view of a part of an air intake, without lip, illustrating an embodiment of the invention.
Figure 8:
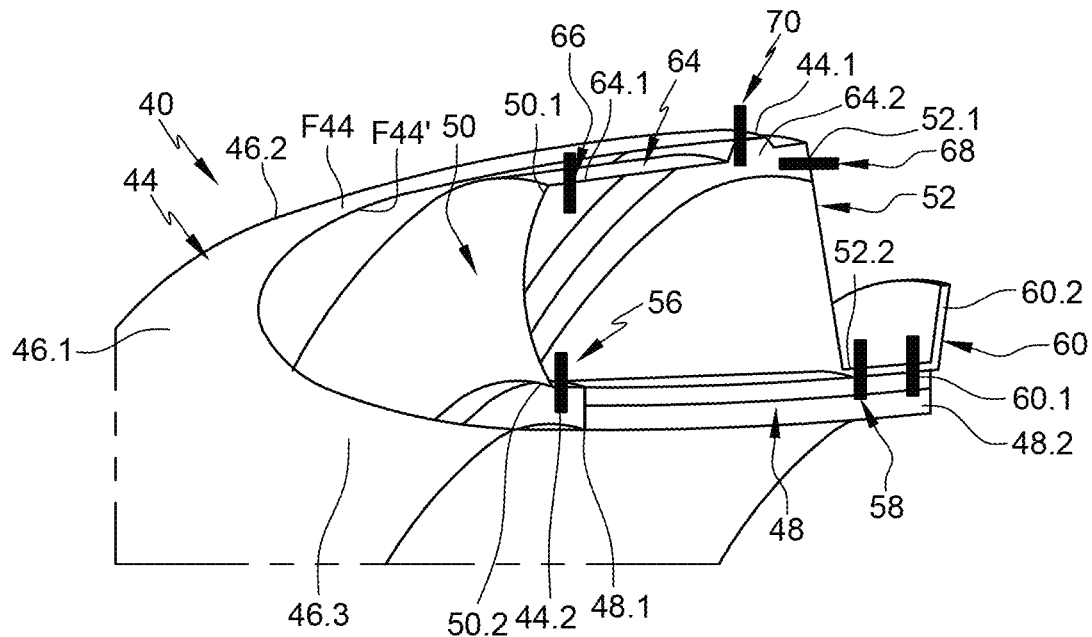
FIG. 8 is a perspective view of a part of an air intake illustrating an embodiment of the invention.

According to another embodiment visible in FIG. 6, the air intake 40 comprises, in addition to the first link system 54, a second link system 56 linking the front peripheral inner edge 50.2 of the front frame 50 and the internal panel 48. In this case, the front peripheral inner edge 50.2 of the front frame 50 is bent back and pressed against the internal panel 48 in a zone away from the front edge 48.1 of the internal panel 48. In addition, the second link system 56 comprises a series of link elements 56.1, distributed over at least one circle about the longitudinal axis of the air intake 40, passing through the front peripheral inner edge 50.2 of the front frame 50 and being housed in the internal panel 48.

Obviously, the invention is not limited to these embodiments. Thus, the front peripheral inner edge 50.2 of the front frame 50 could be bent back, pressed against the lip 44 and linked thereto in a zone away from the internal panel 48.

The air intake 40 also comprises a third link system 58 linking the rear peripheral inner edge 52.2 of the rear frame 52 and the rear edge 48.2 of the internal panel 48. According to one arrangement, the rear peripheral inner edge 52.2 of the rear frame 52 is bent back, pressed against the rear edge 48.2 of the internal panel 48 (or against an element linked to the internal panel 48) and linked thereto. In addition, the third link system 58 comprises a series of link elements 58.1, distributed over at least one circle about the longitudinal axis of the air intake 40, passing through the rear peripheral inner edge 52.2 of the rear frame 52 and being housed in the internal panel 48.

According to an embodiment, the air intake 40 comprises a rear connection system 60 configured to link the air intake 40 to the engine system of the propulsion assembly, more particularly to a fan casing of the engine system. According to an embodiment, this rear connection system 60 comprises at least one angle iron which has a first flange 60.1 linked to the internal panel 48 and a second flange 60.2 positioned in a transverse plane and intended to be linked to the fan casing.

According to one configuration, the rear peripheral inner edge 52.2 of the rear frame 52 is bent back, pressed against the first flange 60.1 of the rear connection system 60 which is itself pressed against the internal panel 48, the link elements 58.1 passing through the rear peripheral inner edge 52.2 of the rear frame 52, the first flange 60.1 and being housed in the internal panel 48.

Obviously, the invention is not limited to this embodiment for linking the internal panel 48, the rear frame 52 and/or the rear connection system 60.

The air intake 40 comprises a link system 62 directly or indirectly linking the rear peripheral outer edge 52.1 of the rear frame 52 and the outer rear edge 44.1 of the lip 44.

According to a feature of the invention, the air intake 40 comprises at least one joining element 64 linking the front and rear peripheral outer edges 50.1, 52.1 of the front frame 50 and of the rear frame 52.

According to one configuration, the air intake 40 comprises a single tubular joining element 64, substantially coaxial to the internal panel 48, which extends over the entire circumference of the air intake 40. According to one arrangement, the joining element 64 comprises several parts linked to one another to form a single-piece part.

According to another configuration, the air intake 40 comprises several joining elements 64 spaced apart from one another, distributed around the internal panel 48.

According to an embodiment, each joining element 64 has a front end 64.1 linked to the front frame 50 and a rear end 64.2 linked to the rear frame 52. In addition, the air intake 40 comprises a front link system 66 linking the front end 64.1 of each joining element 64 and the front peripheral outer edge 50.1 of the front frame 50 and a rear link system 68 linking the rear end 64.2 of each joining element 64 and the rear peripheral outer edge 52.1 of the rear frame 52.

According to an embodiment, the front peripheral outer edge 50.1 of the front frame 50 is bent back so as to have a substantially cylindrical form, coaxial to the front end 64.1 of the joining element 64, and covering the latter. In addition, the front link system 66 comprises at least one series of link elements 66.1, distributed over at least one circle about the longitudinal axis of the air intake 40, passing through the front peripheral outer edge 50.1 of the front frame 50 and the front end 64.1 of each joining element 64. Obviously, the invention is not limited to this embodiment for the link between the front frame 50 and each joining element 64.

According to an embodiment, the rear end 64.2 of each joining element 64 is bent back, pressed against the rear peripheral outer edge 52.1 of the rear frame 52. In addition, the rear link system 68 comprises at least one series of link elements 68.1, distributed over at least one circle about the longitudinal axis of the air intake 40, passing through the rear end 64.2 of each joining element 64 and the rear peripheral outer edge 52.1 of the rear frame 52. Obviously, the invention is not limited to this embodiment for the link between the rear frame 52 and each joining element 64.

According to an embodiment, the lip 44 is linked to each joining element 64 by a link system 70, situated in proximity to the outer rear edge 44.1 of the lip 44, comprising at least one series of link elements 70.1, distributed over at least one circle about the longitudinal axis of the air intake 40, passing through the lip 44 and each joining element 64.

The joining element 64 is positioned between the lip 44 and the internal panel 48. Each joining element 64 has, in line with the link system 70, a rib 72 configured to space apart the lip 44 and each joining element 64 outside of the rib 72. The rib or ribs 72 is or are positioned in a transverse plane. According to one configuration, for each joining element 64, the rib 72 has a section in omega form in planes passing through the longitudinal axis of the air intake 40. Thus, the rib 72 has a central part 72.1 that is substantially cylindrical, more spaced apart from the internal panel 48 and the rest of the joining element 64, and two tapered parts 72.2, 72.3 linking the central part 72.1 to the rest of the joining element 64. Obviously, the invention is not limited to this omega form for the rib 72. With the joining element 64 being spaced apart from the lip 44 outside of the rib 72, the latter is configured to press at least one zone of the joining element 64 against the inner face F44' of the lip 44 to link it to the lip by the link system 70.

Obviously, the invention is not limited to this embodiment for the link linking the lip 44 and the joining element or elements 64.

According to an embodiment, the different link elements 54.1, 56.1, 58.1, 66.1, 68.1, 70.1 can be screws, bolts or rivets.

According to the invention, the front peripheral outer edge 50.1 of the front frame 50 is spaced apart from the lip 44 and is not linked thereto. Consequently, the air intake has no link element, in line with the front frame 50, flush with the outer face F44 of the lip 44 in contact with the external air flow 42.2. Thus, the latter retains its laminar nature over a greatest possible length.

According to another advantage visible in FIGS. 4 and 6, the lip 44 is linked to the rest of the air intake by only two link systems, which makes it possible to reduce the number of link elements to be dismantled or refitted when dismantling or refitting the lip 44.

In addition, during dismantling, the rear frame 52 remains in place, thus ensuring the overall stability of the geometry of the air intake.

Finally, the internal panel 48, the front and rear frames 50, 52 and the joining element or elements 64 form a rigid box structure which reinforces the air intake 40, which offers a better absorption of forces in the event of bird strike.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft air intake comprising:
   a lip which comprises a leading edge, an outer rear edge, and an inner rear edge,
   an internal panel which comprises a front edge, linked to the inner rear edge of the lip, and a rear edge,
   a front frame which comprises a front peripheral outer edge and a front peripheral inner edge linked to the lip, or to the internal panel, or to both,
   a rear frame which comprises a rear peripheral outer edge directly or indirectly linked to the outer rear edge of the lip and a rear peripheral inner edge linked to the rear edge of the internal panel, and,
   at least one joining element linking the front peripheral outer edge and the rear peripheral outer edge,
   wherein the lip and the at least one joining element are linked by a link system situated in proximity to the outer rear edge of the lip,
   wherein the at least one joining element has a rib, in line with the link system, and configured to space apart the lip and the at least one joining element outside of the rib.

2. The aircraft air intake as claimed in claim 1, wherein the at least one joining element comprises:
   a single tubular joining element, substantially coaxial to the internal panel.

3. The aircraft air intake as claimed in claim 1, wherein the at least one joining element comprises:
   several joining elements spaced apart from one another and distributed around the internal panel.

4. The aircraft air intake as claimed in claim 1, wherein the at least one joining element has a front end, and
   wherein the air intake further comprises a front link system linking the front end of the at least one joining element and the front peripheral outer edge of the front frame.

5. The aircraft air intake as claimed in claim 4, wherein the front peripheral outer edge of the front frame is bent back so as to have a substantially cylindrical form, and
   wherein the front link system comprises at least one series of link elements, distributed over at least one circle, passing through the front peripheral outer edge of the front frame and the front end of the at least one joining element.

6. The aircraft air intake as claimed in claim 1, wherein the at least one joining element has a rear end and the air intake comprises a rear link system linking the rear end of the at least one joining element and the rear peripheral outer edge of the rear frame.

7. The aircraft air intake as claimed in claim 6, wherein the rear end of each joining element is bent back and pressed against the rear peripheral outer edge of the rear frame, and
   wherein the rear link system comprises at least one series of link elements, distributed over at least one circle, passing through the rear end of each joining element and the rear peripheral outer edge of the rear frame.

8. The aircraft air intake as claimed in claim 1, wherein the rib has a substantially cylindrical central part, more spaced apart from the internal panel than a rest of the at least one joining element, and two tapered parts linking the substantially cylindrical central part to the rest of the at least one joining element.

9. An aircraft comprising:
   at least one propulsion assembly which comprises the aircraft air intake as claimed in claim 1.

* * * * *